Sept. 8, 1936.  N. H. PRICE  2,053,377
OPHTHALMIC LENS
Filed Aug. 17, 1933  4 Sheets-Sheet 1
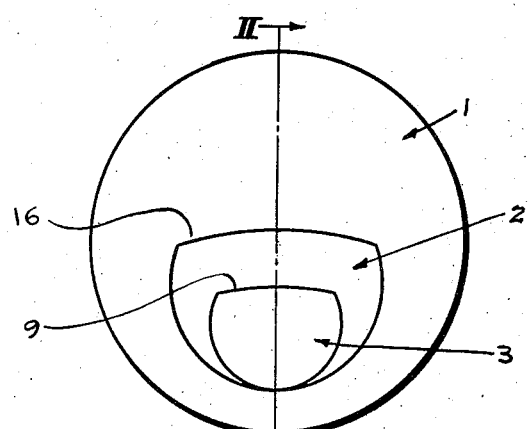
FIG. I.
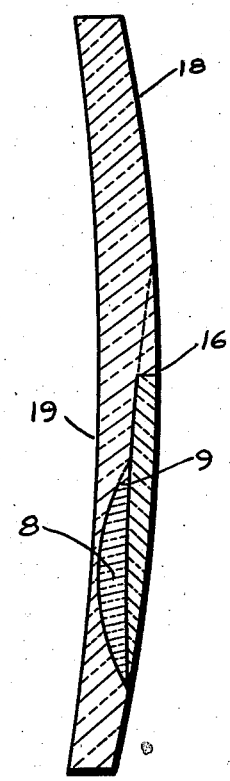
FIG. II.
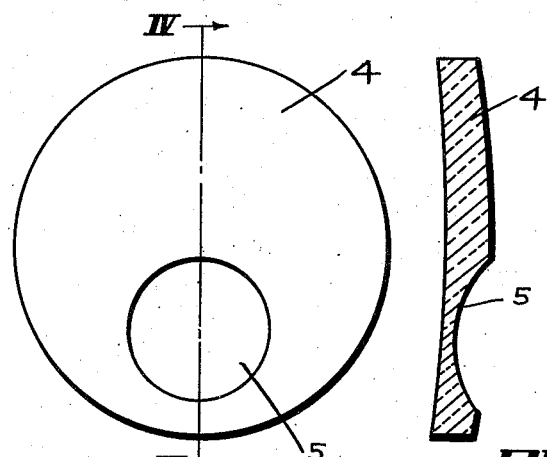
FIG. III.
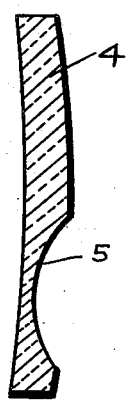
FIG. IV.
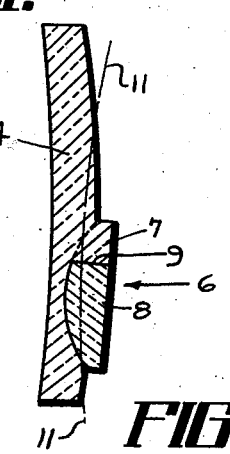
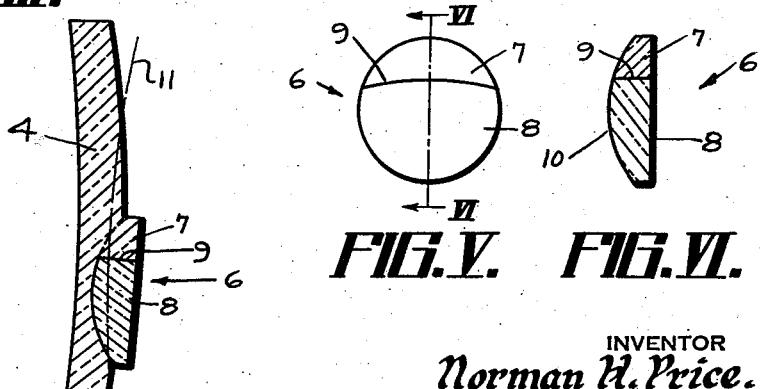
FIG. V.  FIG. VI.
FIG. VII.
INVENTOR
Norman H. Price.
BY
Harry H. Styll
ATTORNEY Sept. 8, 1936.  N. H. PRICE  2,053,377
OPHTHALMIC LENS
Filed Aug. 17, 1933  4 Sheets-Sheet 2
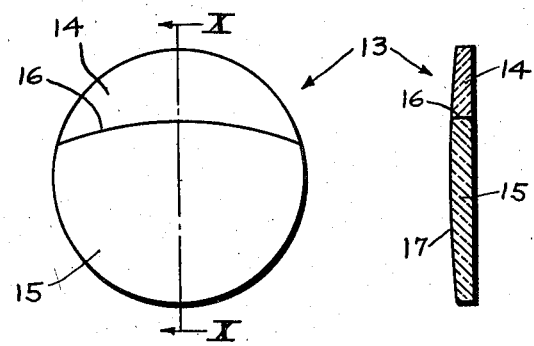
FIG. IX.  FIG. X.
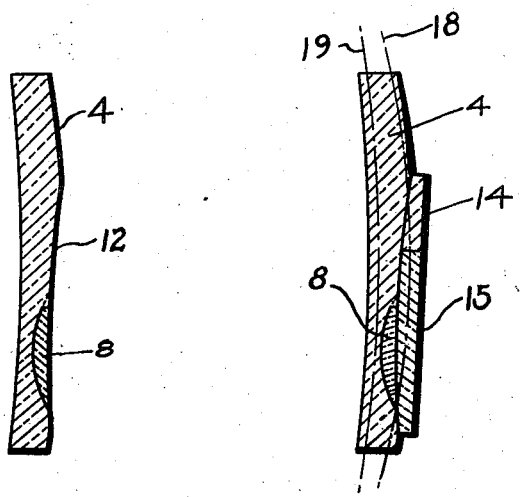
FIG. VIII.  FIG. XI.
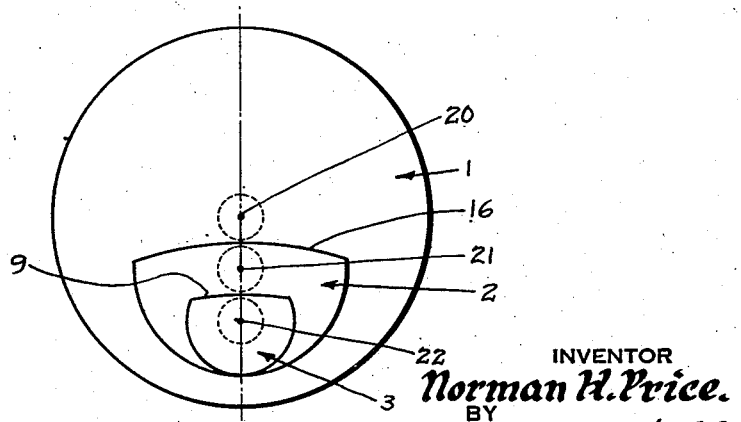
FIG. XII
INVENTOR
Norman H. Price.
BY
Harry H. Styll
ATTORNEY Sept. 8, 1936.   N. H. PRICE   2,053,377
OPHTHALMIC LENS
Filed Aug. 17, 1933   4 Sheets-Sheet 3
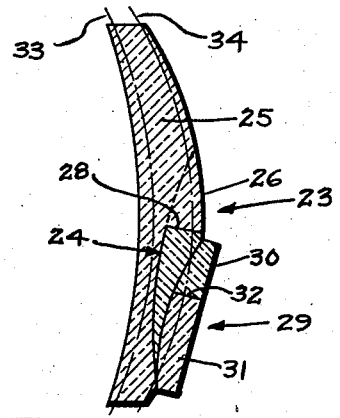
FIG. XIII
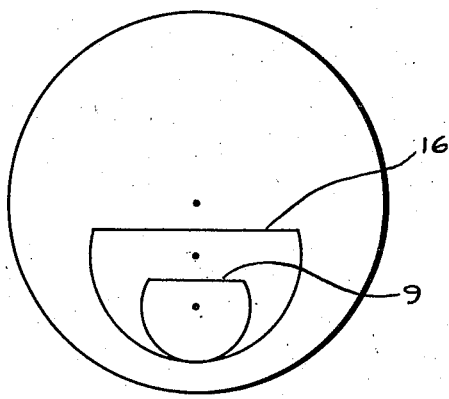
FIG. XIV
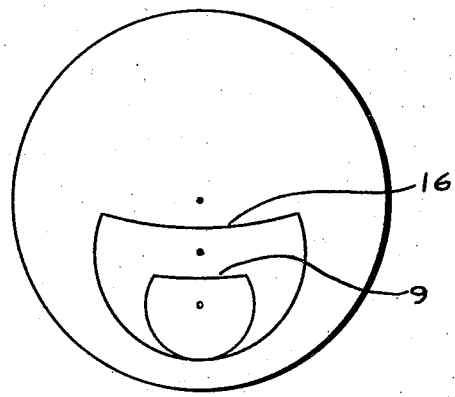
FIG. XV
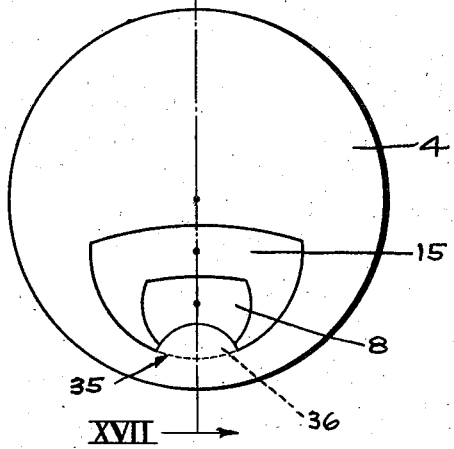
FIG. XVI
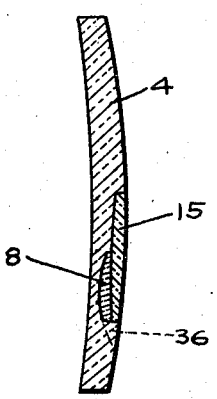
FIG. XVII
INVENTOR
Norman H. Price.
BY Harry H. Styll
ATTORNEY Sept. 8, 1936.   N. H. PRICE   2,053,377
OPHTHALMIC LENS
Filed Aug. 17, 1933   4 Sheets-Sheet 4
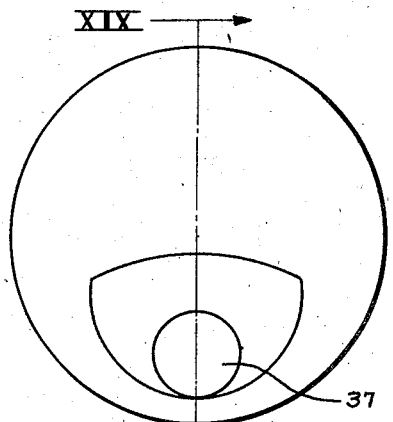
FIG. XVIII
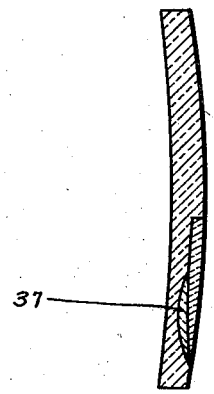
FIG. XIX
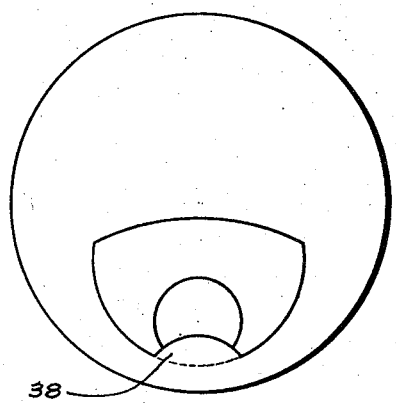
FIG. XX
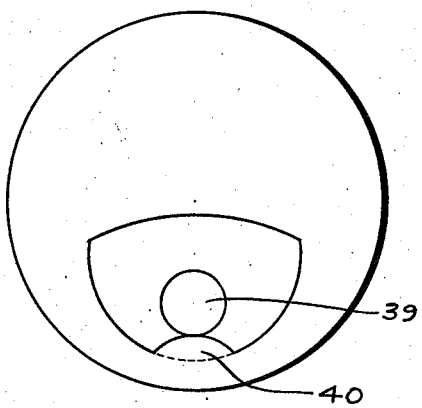
FIG. XXI
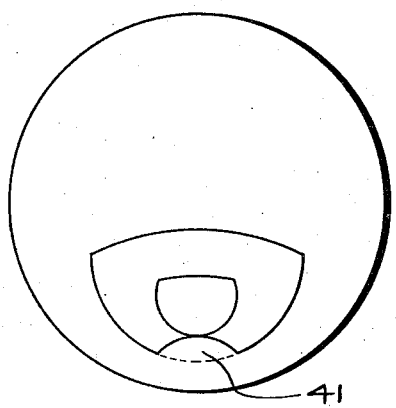
FIG. XXII
INVENTOR
Norman H. Price.
BY
Harry H. Styll
ATTORNEY Patented Sept. 8, 1936

2,053,377

UNITED STATES PATENT OFFICE 2,053,377

OPHTHALMIC LENS

Norman H. Price, Southbridge, Mass., assignor to American Optical Company, Southbridge, Mass., a voluntary association of Massachusetts Application August 17, 1933, Serial No. 685,526

5 Claims. (Cl. 88—54)

This invention relates to improvements in ophthalmic lenses and has particular reference to an improved type of trifocal or lens with more than two foci, blank therefor, and process of making the same.

One of the principal objects of the invention is to provide a trifocal or multifocal lens of more than two foci having its various focal fields shaped to allow a wide entrant field of vision into the different focal fields thereof, and in which the vertical prismatic displacement when the eye passes from one focal field into another will be greatly reduced.

Another important object of the invention is to provide a trifocal or multifocal lens of the above character having its various focal fields arranged so that the line between the distance and intermediate fields will fall between the optical center of the distance field and the optical center of the segment per se of the intermediate field and the line between the intermediate and reading fields will fall between the optical center of the segment per se of the intermediate field and the segment per se of the reading field, said lines being located with respect to the various parts of the lens so that the eye of the wearer will be substantially over the optical center of the parts when the eye is free of the line between said parts.

Another object of the invention is to provide a trifocal or multifocal lens of the character described having a segmental field with a wide entrant field of vision and having another segmental field within the field of the first segmental field.

Another object is to provide an improved trifocal lens having an intermediate power field and a reading field of practically the same shape and which are greater in width than in height.

Another object is to provide a trifocal or multifocal lens having a field of a different focal power below the reading field and an improved process of making the same.

A further object is to provide novel and improved means and process of producing a trifocal or multifocal lens of the above character and blank therefor on a practical commercial basis and of controlling the location of the optical or geometrical centers of the different focal fields of the finished lens.

Other objects and advantages of the invention will become apparent from the following description taken in connection with the accompanying drawings, and it will be apparent that many changes may be made in the details of construction, arrangement of parts, and steps of the process shown and described without departing from the spirit of the invention as expressed in the accompanying claims. I, therefore, do not wish to be limited to the exact details of construction and steps of the process shown and described as the preferred forms only have been shown by way of illustration.

Referring to the drawings:

Fig. I is a front elevation of a lens embodying the invention;

Fig. II is an enlarged sectional view taken on line II—II of Fig. I;

Fig. III is a front elevation of the major blank showing a step in the process of manufacture;

Fig. IV is a sectional view taken on line IV—IV of Fig. III;

Fig. V is a front elevation of one of the segment portions of the lens;

Fig. VI is a sectional view taken on line VI—VI of Fig. V;

Fig. VII is a sectional view showing the segment of Fig. V secured to the major portion of Fig. III;

Fig. VIII is a view similar to Fig. VII showing a further step in the process of manufacture;

Fig. IX is a front elevation of another segment portion of the lens;

Fig. X is a sectional view taken on line X—X of Fig. IX;

Fig. XI is a sectional view showing the segment portion of Fig. IX secured to the blank of Fig. XIII and illustrating in dot and dash lines how the finished surfaces are formed thereon to complete the lens;

Fig. XII is a view similar to Fig. I showing a slightly modified form of the invention;

Fig. XIII is a sectional view similar to that shown in Fig. XI showing another modified form of the invention;

Fig. XIV is a front elevation showing a further modification;

Fig. XV is a front elevation showing a still further modification;

Fig. XVI is a front elevation showing a further modification;

Fig. XVII is a sectional view taken on line XVII—XVII of Fig. XVI;

Fig. XVIII is a front elevation of a further modification;

Fig. XIX is a sectional view taken on line XIX—XIX of Fig. XVIII;

Fig. XX is a front elevation of a further modification;

Fig. XXI is a similar view of a further modification; and

Fig. XXII is a similar view of a still further modification.

It has been found from past practice that the prismatic displacement encountered in bifocal lenses when the eye travels from the distance field into the reading field of the lens is best reduced by placing the line of division of the distance and reading fields near the optical centers of said fields. This not only reduces the prismatic displacement but also forms a reading field having a wide entrant field to the eye when passing from the distance field into the reading field.

This arrangement has proven very satisfactory in lenses of the bifocal type, and it, therefore, is one of the primary objects of this invention to incorporate these features in a trifocal or multifocal lens and to provide improved means and process for producing such lenses on a practical commercial basis and of controlling the location of the optical or geometrical centers of the different focal fields of the finished lens.

Referring more particularly to the drawings wherein like characters of reference designate like parts throughout the several views, the lens embodying the invention, as shown in Figs. I to XI inclusive, comprises an upper distance field 1, an intermediate field 2, and a reading field 3. The lens, as shown in Figs. III to XI inclusive, comprises a major portion or blank 4 formed preferably of crown glass having a given refractive index and having a segment seat 5 formed on one face thereof in the usual prior art manner. This segment seat 5 is provided with a ground and polished surface of the required radius to produce the desired power through the segment which is to be secured on said seat. The major blank 4 may be flat or meniscus shaped, as desired, and the seat 5 may be formed on the convex or concave face of the blank, depending upon which face the segment or composite button 6 is to be secured. The segment or composite button 6 is preferably formed of two pieces of glass 7 and 8 fitted together edge to edge along a line of joinder 9 of predetermined shape and are fused together in this relation. The surfaces of said abutting edges in this instance being preferably cylindrical and arched upwardly. The composite button thus formed is provided on one face with a continuous curve 10 substantially equal to that of the curve or face of the seat 5 and is fused or otherwise secured on said seat, as shown in Fig. VII.

The inter-engaging surfaces of the glasses 7 and 4, which preferably are of the same kind of glass or glass of a similar nature are adapted to merge and disappear when the parts are in fused relation with each other. The portion 8, which is formed of a glass having a different index of refraction from that of the major blank 4, such as a flint or barium crown glass, remains visible after fusion.

The blank, as illustrated by the dot and dash line 11 in Fig. VII, and by the full line in Fig. VIII, is surfaced on the segment side thereof with a continuous curve forming the countersink or seat 12 for the segment 13 shown in Figs. IX and X. The segment or composite button 13 is preferably formed of two pieces of glass 14 and 15 fitted together edge to edge along a line of joinder 16 of predetermined shape and are fused together in this relation. The composite segment 13 is then provided on one face with a continuous curve 17 substantially equal to that of the curve of the countersink or seat 12 and is thereafter fused or otherwise secured in said countersink or seat, as shown in Fig. XI. The portion 14 which is preferably formed of the same kind of glass or glass of a similar nature to that of the major blank 4 is adapted to merge with said blank and disappear when the parts are in fused relation with each other. The portion 15 which is formed of a glass having a different index of refraction from that of the major blank 4 remains visible after fusion. The radius of the curve 12 being such as to produce the desired power through the combined portions 4 and 15 in the finished lens, it being understood that the indices of refraction of the various parts are also controlled to produce the desired results. In this type of lens the portion 15 is formed of a glass having a higher index of refraction than the portion 4 but may be of the same glass or same index glass as the portion 8, or different as desired.

After the parts have been properly fused with each other, a continuous curve 18, illustrated by the dot and dash line in Fig. XI and by the full line in Fig. II, is formed on the segment side of the lens. This curve in practice is preferably the base curve. The lens is then provided on the opposite side, as indicated by the dot and dash line 19 in Fig. XI and by the full line in Fig. II, with a curve of the required radius to produce the powers desired in the finished lens. This curve in practice is preferably the prescription curve and in most instances is the controlling factor of the power of the finished lens. The lens is then cut and edged to the required shape in the usual prior art manner.

In Fig. XII, the dividing lines between the different focal fields of the lens are shown positioned between the optical centers of the said fields. The location of the optical center 20 of the distance field 1, the optical center 21 of the intermediate field 2 and the optical center 22 of the reading field 3 and the dimensions of the intermediate and reading fields of the lens are such that when the eye passes over the dividing line 16 of the intermediate field it immediately lies in the vicinity of the optical center or most usable portion of the intermediate field and likewise when the eye passes over the dividing line 9 it immediately lies in the vicinity of the optical center 22 or most usable portion of the reading field. It is apparent that although applicant shows and describes the above arrangement, the said optical or geometrical centers and the positions of the dividing lines relative to said centers may be varied as desired, that is, the dividing lines may pass through said centers or above or below as desired.

Attention is directed to the fact that the dividing lines 16 and 9 may be arched upwardly as shown in Figs. I and XII, straight across as shown in Fig. XIV, or arched downwardly as shown in Fig. XV. It also will be understood that the dividing lines 16 and 9 may be made in various different combinations of the above shape, that is, one may be straight and the other arched downwardly or one may be arched upwardly and the other arched downwardly, or one made straight and the other arched upwardly, etc.

Attention is directed to the fact that when the dividing lines 9 and 16 are arched upwardly or downwardly and provided with cylindrical surfaces, that the light rays impinging thereon will be deflected in different directions and the eye will see only a narrow streak of light, if any, instead of a continuous band of light as would be the case if made straight and the surfaces not provided with some means for obviating the reflections.

By moving the lines 9 and 16 nearer the optical centers 21 and 22, the prismatic displacement and distortion encountered when passing from one focal field into another in a vertical direction is greatly reduced, the reason being that the prismatic displacement and distortion decreases as the eye approaches the area of the optical centers.

Although applicant has described the major blank 4 as being formed of a crown glass, it is to be understood that it may be formed of any desired glass having any desired refractive index and that the portions 7, 8, 14 and 15 may be formed of any suitable glasses for producing the results desired. In all instances the preferred form of lens will have an upper distance field 1, an intermediate field 2, and a reading field 3 having cylindrical upwardly arching dividing lines 9 and 16 with the optical centers of the different focal fields so positioned relative to said dividing lines as to lie in the vicinity of the center of the pupil of the eye when the eye travels from one field into the other. It is also apparent that any combination of glasses having any suitable refractive indices, reciprocal relative dispersions, and expansion factors may be used in forming lenses of this character, depending mainly upon the nature of the lens and its requirements, it being understood that the controlling of these factors is for the purpose of obtaining the desired powers, fusion faculties and color properties. It is also apparent that the order of the power of the different focal fields may be changed, that is, the intermediate field may be above or below the reading field as desired.

In Fig. XIII there is shown a further modification wherein the segment 23 forming the intermediate field is fused directly within a countersink or seat 24 formed in the major portion 25 of the lens. The composite button 23 forming the intermediate field is formed preferably of two pieces of glass 26 and 27 fused together edge to edge along a line of joinder 28. The portion 26 is preferably formed of the same glass or glass similar to that of the portion 25 and is adapted to blend therewith and disappear when the composite button 23 is fused to the seat 24. The portion 27 is preferably of a different index of refraction and remains visible. The portion 25 is then formed with a countersink or seat 43 adapted to receive the composite button 29 which forms the reading field of the lens. The composite button 29 comprises two pieces of glass 30 and 31 fused together edge to edge along the line of joinder 32. The composite button 29 is provided on one face thereof with a continuous curved surface substantially equal to that of the curve of the countersink or seat 43 and is fused to said seat. The portion 30 which is preferably of the same or substantially the same kind of glass as the portion 25 is adapted to blend therewith and disappear when the parts are in fused relation with each other. The portion 31 which is formed of glass of a different index of refraction remains visible. The lens is then provided with finished optical surfaces as indicated by the dot and dash lines 33 and 34 in Fig. XIII.

It is to be understood that the different focal fields may be formed of glasses of any desired indices of refraction and that the curves of the countersinks or seats 24 and 43 are such that when the lens is completed, the fields will be of the desired focal powers.

It is also apparent that the order of the different focal fields may be changed as desired and that any combination of glasses having any suitable refractive indices, reciprocal relative dispersions, and expansion factors may be used in forming this type of lens, depending mainly upon the nature of the lens and its requirements, it being understood that the controlling of these factors is for the purpose of obtaining the desired powers, fusion faculties, and color properties. It is also apparent that the optical centers of the different focal fields may be varied as desired, and the positions of the dividing lines between the different focal fields may be placed in any desired relation with said optical centers.

In Figures XVI and XVII there is shown a slight modification wherein the lower portions of the segments 8 and 15 are cut away to form a lower distance field 35. This lower distance field is formed by securing a portion of glass 36 of substantially the same kind of glass as that of the major portion 4 to the edges formed by the cut away portions of the members 8 and 15. The portion 36 is adapted to blend with the major portion 4 and disappear when the parts are in fused relation with each other.

In Figures XVIII and XIX there is shown a further modification wherein the reading field, instead of being formed of two pieces of glass 7 and 8 as shown in Figs. I and II is formed of a single piece of glass 37 which is circular in contour instead of having a transversely extending dividing line 9 as shown in Fig. V. The lens except for the reading field formed by the portion 37 is identical to that shown in Figures I and II and is formed in a similar manner.

In Fig. XX there is shown a further modification wherein a lens of the type shown in Fig. XVIII is provided with a lower distance field 38. This lower field 38 is formed in a manner similar to that of the lens shown in Figures XVI and XVII and described above, wherein the lower portions of the segments forming the intermediate and reading fields are cut away and replaced with a portion of glass similar to that of the major portion and which is adapted to blend therewith and disappear when the parts are fused together.

In Fig. XXI there is shown a further modification wherein a reading field 39 of the type shown in Fig. XVIII is placed above the cut away portion 40 forming a lower distance field. The object of placing the segment portion forming the reading field 39 above the lower distance field 40 is to obviate cutting away the lower portion of the segment forming the reading field as is the case in a lens of the type shown in Fig. XX.

In Fig. XXII there is shown a further modification wherein the reading field of a lens of the type shown in Fig. I is placed above the cut away portion 41 forming the lower distance field of the lens. This arrangement obviates removing the lower portion of the segment forming the reading field.

In all of the above lenses, it is apparent that the abutting edge surfaces forming the line of joinder between the different focal fields of the lens may be provided with any means known to the art for eliminating reflections from said surfaces. If desired the surfaces of said edges may be inclined with respect to the axis of the lens and may be shaped in any manner known in the art to reduce reflections.

Attention is directed to the fact that although the segments or layers of glass forming the intermediate and reading fields of the lens are shown and described as being in superimposed relation with each other on one side of the lens they may, in some instances be placed on opposite sides thereof. It is also apparent that although applicant shows his segments as having a portion circular in contour and a portion departing from said circle they may be made square, oblong, rectangular, triangular etc., by any method known in the art.

Attention is also directed to the fact that in the finished lens the sides and top edges of the reading field are removed from the corresponding edges of the intermediate field.

From the foregoing description, it will be seen that I have provided simple, efficient, and economical means and process of accomplishing all the objects and advantages of the invention.

Having described my invention I claim:

1. A multifocal lens having a distance field, a reading field and an intermediate field, each of said fields having its respective optical center lying within the limits of its contours, the upper edges of said reading and intermediate fields being in spaced relation with each other and being relatively thick and extending in a direction transversely of the distance field with their respective upper edges lying between their optical centers and the optical center of the distance field, said reading and intermediate fields each having a relatively thick lower edge lying substantially in aligned relation with each other in the direction of the line of sight through the lens with each of said aligned edges abutting a piece of lens medium of substantially the same kind of glass as the glass forming the distance field and at an appreciable distance from the lower edge of the lens, whereby continuous surfaces may be formed on the opposite sides of the lens and a lower distance field of substantially the same power as the upper distance field may be formed below the reading and intermediate fields.

2. A multifocal lens having a distance field, a reading field and an intermediate field, each of said fields having its optical center lying within the limits of its contours, the upper edges of said reading and intermediate fields being in spaced relation with each other and being relatively thick and extending in a direction transversely of the distance field with their respective upper edges lying between their optical centers and the optical center of the distance field, said reading and intermediate fields each having an upwardly curved relatively thick lower edge lying substantially in the direction of the line of sight through the lens, with each of said edges abutting a piece of lens medium of substantially the same kind of glass as the glass forming the distance field, said aligned upwardly curved lower edges of the intermediate and reading fields being spaced an appreciable distance from the lower edge of the lens to provide a distance field below the reading field, said lower distance field, like the intermediate and reading fields, being provided with a relatively thick upper edge formed by the abutment of the piece of lens medium forming said field with the relatively thick lower edges of the intermediate and reading fields.

3. A multifocal lens having a distance field, a reading field and an intermediate field, the upper edges of reading and intermediate fields being in spaced substantially parallel relation with each other and being relatively thick and extending in a direction transversely of the distance field, said reading and intermediate fields each having relatively thick lower edges lying substantially in aligned relation with each other in the direction of the line of sight through the lens with each of said aligned edges abutting a piece of lens medium of substantially the same kind of glass as the glass forming the distance field and at an appreciable distance from the lower edge of the lens, whereby continuous surfaces may be formed on the opposite sides of the lens and a lower distance field of substantially the same power as the upper distance field may be formed below the reading and intermediate fields.

4. A multifocal lens comprising a distance field having an intermediate field embedded therein and a reading field embedded in the intermediate field, the upper edges of said reading and intermediate fields being in spaced relation with each other and being relatively thick and extending in a direction transversely of the distance field, said reading and intermediate fields each having a relatively thick lower edge lying substantially in aligned relation with each other in the direction of the line of sight through the lens with each of said aligned edges abutting a piece of lens medium of substantially the same kind of glass as the glass forming the distance field and at an appreciable distance from the lower edge of the lens, whereby continuous surfaces may be formed on the opposite sides of the lens and a lower distance field of substantially the same power as the upper distance field may be formed below the reading and intermediate fields.

5. A multifocal lens comprising a distance field, an intermediate field, and a reading field, the upper edge of one of said fields lying within the distance field being relatively thick and extending in a direction transversely of the distance field and in spaced relation with the upper edge of the other of said fields, and the lower edges of said intermediate and reading fields lying substantially in aligned relation with each other in the direction of the line of sight through the lens, with one of said aligned edges being relatively thick and abutting a piece of lens medium of substantially the same kind of glass as the glass forming the distance field and at an appreciable distance from the lower edge of the lens, whereby continuous surfaces may be formed on the opposite sides of the lens and a lower distance field of substantially the same power as the upper distance field may be formed below the reading and intermediate fields.

NORMAN H. PRICE.